United States Patent [19]

Haakonsen et al.

[11] 4,337,128
[45] Jun. 29, 1982

[54] CUPRIC AND FERRIC CHLORIDE LEACH OF METAL SULPHIDE-CONTAINING MATERIAL

[75] Inventors: Carl Haakonsen, Kristiansand; Thomas Thomassen, Brekkestoe, both of Norway

[73] Assignees: Elkem a/s; Falconbridge Nikkelverk A/S, both of Norway; Falconbridge Nickel Mines, Ltd.; The Superior Oil Company, both of Canada

[21] Appl. No.: 254,955

[22] Filed: Apr. 16, 1981

[30] Foreign Application Priority Data

Oct. 7, 1980 [NO] Norway .............................. 802986

[51] Int. Cl.³ .......................... C25C 1/12; C25C 1/16; C22B 3/00
[52] U.S. Cl. .................... 204/107; 204/117; 204/118; 75/104; 75/117; 75/118 R; 75/120; 423/38; 423/98; 423/100; 423/109
[58] Field of Search ...................... 204/107, 117, 118; 75/104, 117, 118, 120; 423/38, 100, 109, 98

[56] References Cited

U.S. PATENT DOCUMENTS

| | | | |
|---|---|---|---|
| 3,441,372 | 4/1969 | Pegler | 423/100 |
| 3,692,647 | 9/1972 | Chambers | 204/107 |
| 3,776,826 | 12/1973 | Atadan | 204/107 |
| 3,785,944 | 1/1974 | Atwood | 204/107 |
| 3,901,776 | 8/1975 | Kruesi | 204/107 |
| 3,923,616 | 12/1975 | Atadan | 75/104 |
| 4,159,232 | 6/1979 | Bacon | 204/107 |
| 4,181,588 | 1/1980 | Wong | 204/117 |
| 4,230,487 | 10/1980 | DeMarthe | 75/120 |
| 4,272,341 | 6/1981 | Lamb | 204/118 |

Primary Examiner—Brian E. Hearn
Attorney, Agent, or Firm—Eyre, Mann, Lucas & Just

[57] ABSTRACT

A method of leaching of metal sulphide-containing material is disclosed. The metal sulphides can be iron, copper, lead, silver, mercury and/or zinc. The leaching is effected by means of chloride-containing solutions through red-ox reaction. The metal sulphide-containing material is reacted with a solution which consists chiefly of cupric chloride and ferric chloride.

14 Claims, 2 Drawing Figures

CUPRIC AND FERRIC CHLORIDE LEACH OF METAL SULPHIDE-CONTAINING MATERIAL

BACKGROUND OF THE INVENTION

The present invention relates to a method of leaching of metal sulphide-containing material which contains one or more metal sulphides of the metals iron, copper, lead, silver, mercury and zinc and aims particularly at leaching of sulphide ores, which besides copper also can contain one or more of the above mentioned metal sulphides together with other valuable metals for the purpose of recovering the metal values.

The leaching is effected by means of chloride-containing solutions according to the red-ox principle by treating the metal sulphide-containing material with a solution which chiefly consists of bivalent copper (cupric) chloride and threevalent iron (ferric) chloride, where the metals are brought into solution as metal chloride, which can be recovered from the solution. The metal-containing solution is conducted to recovery processes for recovery of the separate metals. During the leaching process the originally bivalent copper (cupric) chloride and the threevalent iron (ferric) chloride are reduced to respectively monovalent copper (cuprous) chloride and bivalent iron (ferrous) chloride which are subsequently reoxidized to bivalent copper chloride and threevalent iron chloride by a regeneration process, whereupon the regenerated liquor is used again in the process. For metal recovery processes such as electro recovery of copper, liquid-liquid extraction of zinc and other processes, it is of advantage and in some cases absolutely necessary that the leach liquor is maximally reduced to bivalent iron and monovalent copper.

Several methods for leaching of metal sulphide-containing material are known, but these processes have the drawback that they do not secure a combination of such maximum reduction and complete leaching of the metal values in the raw material. The known methods do not specify why a complete reduction is not obtained, but it is to be assumed that in practical operation, because of the variations in the composition of the metal sulphide-containing material and the regenerated leach liquor, it is very difficult to proportionate in such a way that the process can be carried out under complete stoichiometry in order to obtain the required combination of complete leaching and complete reduction.

SUMMARY OF THE INVENTION

The inventors have, however, found a method which makes it possible to combine a complete leaching with a complete reduction.

By the method of the invention the liquor from the regeneration step is separated into two parallel split flows of which one is conducted to a primary leaching step in which the supplied metal sulphide-containing material is present in excess in relation to the oxidizing compounds in the leach solution, which is thereby essentially completely reduced because of the superstoichiometric amount of metal sulphide-containing material in relation to the oxidized compounds in the leach liquor. The leach liquor which contains monovalent copper chloride, bivalent iron chloride and other extracted metal chlorides is piped off for further treatment in the different metal recovery steps in conventional manner.

The residue from the primary leaching step is conducted to a secondary leaching step to which the other portion of the regenerated liquor is supplied in excess in relation to the metal contents in the leach residue. In this way the remaining metal values in the residue are leached by a superstoichiometric amount of oxidized compounds in the leach liquor in relation to the metal sulphide-containing material. The residue which among other compounds chiefly consists of elementary sulphur and pyrite is removed from the process. The used liquor from the secondary leaching step is conducted directly to the regeneration process. During this process the monovalent copper and the bivalent iron are oxidized to respectively bivalent copper and threevalent iron by means of oxygen in conventional manner. In the regeneration step there may also be supplied chlorine. Minor amounts of sulphur will be oxidized to sulphate in the leaching steps. An accumulation of sulphate in the circulating liquor can be avoided by addition of alkali-ions in the regeneration step whereby sulphate will be precipitated as jarosite in the regeneration step.

The ratio between that amount of liquor which goes to the primary leaching step and that amount of liquor which goes to the secondary leaching step will vary depending on concentration of ingredients and operating conditions but in general may range from supplying equal amounts of leach liquor to each leaching step up to supplying fifty times as much leach liquor to the primary leaching step over that amount supplied to the secondary leaching step. Best results are obtained by extracting at least about 60% by weight of the leachable metals in the metal sulphide-containing material in the primary leaching step and preferably up to 90% are extracted.

By this split flow process where regenerated liquor from the regeneration step is divided in two parallel flows, fresh concentrate as well as the residue from the primary leaching step will be treated with fresh regenerated liquor. The primary leaching step as well as the secondary leaching step can comprise one or more reactors arranged for co-current or counter-current flow of leach liquor and metal sulphide-containing material. The metal values are recovered in known way as for instance by crystallization of lead chloride, electro recovery of copper and liquid-liquid extraction of zinc. After extraction of metals the leach liquor may be piped to the regeneration stage and recycled in the process.

Figure 1:
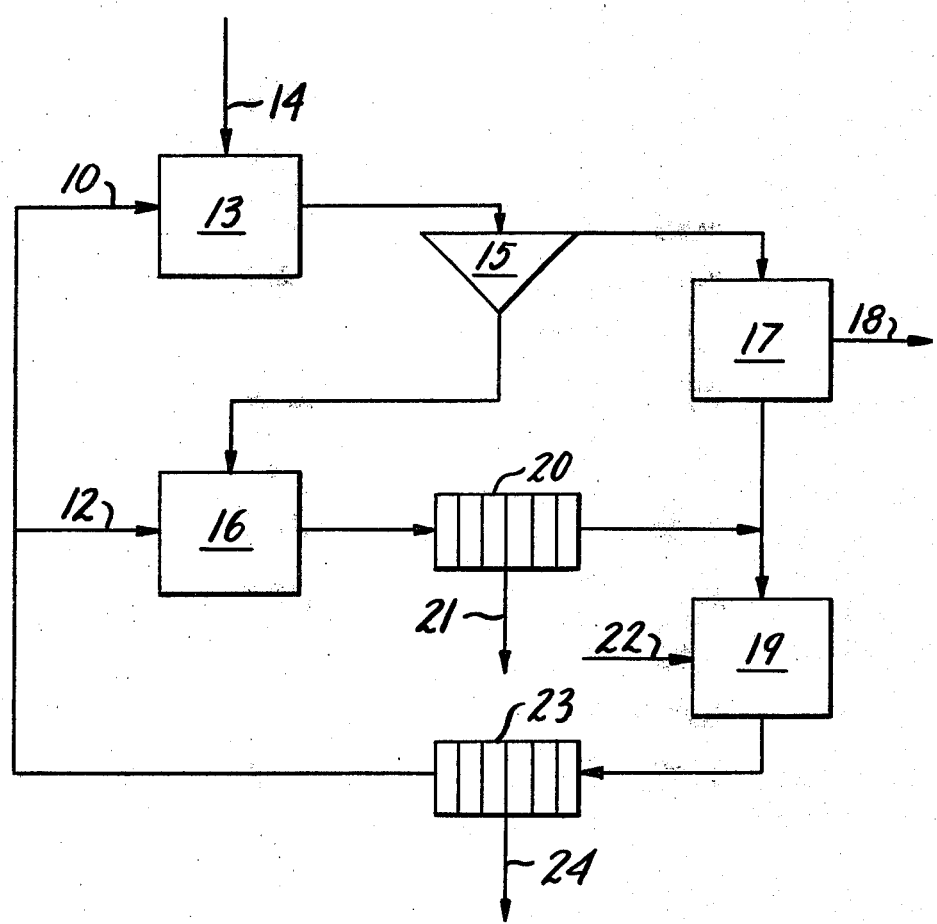
FIG. 1 is a simplified flow diagram of one embodiment of the split flow leaching process.

In the flow sheet of FIG. 1, 10 and 12 indicate respectively the primary flow and the secondary flow of the regenerated electrolyte which is supplied to the two leaching steps. The primary flow 10 is supplied to the primary leaching step as indicated by 13 where fresh concentrate is supplied as indicated by 14. The leaching takes place in a container with a stirring equipment and the container is lined with acid resistant material. The leach liquor containing suspended leach residue is conducted further to known conventional filtration and thickening equipment as indicated by 15, and the solids from this equipment are piped further to the secondary leaching step 16 in which it is contacted by the split flow 12 of the regenerated solution. Also the leaching in the secondary leaching step takes place in a container which is equipped with stirring apparatus and lined with acid resistant material. The liquid from the thickener 15 which contains metal values dissolved as chlorides are conducted further to known conventional metal recovery processes, which are schematically illustrated by 17 and the recovered metal values are removed from the process as indicated by 18.

The solution from the metal recovery process is then conducted to a known conventional regeneration step 19 in which it is contacted by the solution from the secondary leaching step 16 which solution has passed through a filter equipment 20 from which precipitated sulphur etc. is removed at 21. In the regeneration step there is supplied oxygen (air) as indicated by 22. As mentioned above, it is also here possible to supply chlorine and alkali-ions if necessary. The liquor from the regeneration step is conducted to a filtration apparatus 23 from which precipitated iron oxides and jarosite are removed as indicated by 24. The regenerated liquor is then conducted further in the split flows 10 and 12 as described above.

In order to obtain as high degree of leaching as possible the temperature in the leaching tanks is maintained as close to the boiling point as possible and will then usually be around or slightly above 100° C. There has been obtained degrees of leaching for the different valuable metals from 98% and upwards towards complete leaching with concurrent essentially complete reduction of the cupric chloride and ferric chloride to the respective monvalent copper chloride and bivalent iron chloride in the primary leaching step which is of great advantage for recovery of the valuable metals.

EXAMPLE 1

A sulphide concentrate essentially consisting of chalcopyrite containing some zinc blende was leached in accordance with the split flow process of the present invention illustrated in FIG. 1.

In this Example the primary leaching step 13 comprised two tanks lined with acid resistant material and equipped with stirring apparatus. Leaching was carried out continuously and the tanks were arranged in conventional manner so that the solid material and the liquor at 10 passed in counter-current flow. Each of the containers had an effective volume of 300 liters. The separation of the liquid and the solids was effected in thickener 15, and the overflow was treated in subsequent apparatus at 17 for separate recovery of copper and zinc respectively. The resulting solution was then regenerated at 19, 23 and 24. The underflow from thickener 15 was conducted to the secondary leaching step 16 for further leaching with regenerated liquor at 12. This step comprised a 300 liter container lined with acid resistant material and equipped with stirring apparatus. The separation of the liquid and the solids from the secondary leaching step was effected in filter press 20 and the liquor was regenerated at 19, 23 and 24.

The temperature in both leaching steps was 105° C. The process was controlled by means of red-ox electrodes in conventional manner.

(1) The analysis of the feed sulphide concentrate in % by weight was:

| Cu | Zn | Fe | S |
|---|---|---|---|
| 29,2 | 1,0 | 28,3 | 33,3 |

Concentrate was supplied at the rate of: 50.7 kilograms per hour.

Flow of the regenerated leach liquor into primary leaching step 13 was: 300 liters per hour.

Flow of leach liquor out of leaching step 13 was: 246 liters per hour.

The difference between in- and outgoing liquor, 54 liters per hour, leaves leaching step 13 through the underflow of the thickener 15.

Flow of regenerated leach liquor to secondary leaching step 16 was: 156 liters per hour.

Flow of leach liquor out of leaching step 16 was: 210 liters per hour.

(2) Analysis of the leach liquors in grams per liter was:

| | $Cu^{2+}$ | $Cu^+$ | $Fe^{3+}$ | $Fe^{2+}$ | $Zn^{2+}$ | $Na^+$ | $SO_4^{2-}$ | $H^+$ | $Cl^-$ |
|---|---|---|---|---|---|---|---|---|---|
| Regenerated leach liquor to 13 and 16 | 40,0 | 0 | 128,7 | 22,0 | 38,0 | 25,0 | 4,0 | 0,14 | 400,0 |
| Leach liquor out of step 13 | 4,0 | 91,2 | 0 | 191,1 | 40,0 | 25,0 | 11,3 | 0,79 | 400,0 |
| Leach liquor out of step 16 | 49,7 | 0 | 90 | 68,5 | 38,1 | 25,0 | 4,4 | 0,26 | 400,0 |

Analysis of leaching residues from 21 in % by weight was:

| | Percent | Degree of leaching (percent) |
|---|---|---|
| Cu | 0,8 | 99 |
| Zn | 0,05 | 98 |

Conclusion

As shown by the analyses there is by this method obtained an essentially completely reduced liquor from the primary leaching step, which is combined with an essentially complete leaching of the metal values.

EXAMPLE 2

A chalcopyrite concentrate (with smaller amounts of zinc blend than in Example 1) was here leached in the same equipment and in the same flow arrangement as in Example 1 but under other conditions in order to show the flexibility of the process of the invention. In the metal recovery step practically all copper was removed from the solution so that the recycled leach liquor which was formed after the oxidation step was poor in copper.

| Analysis | Percent by weight | | | |
|---|---|---|---|---|
| | Cu | Fe | Zn | S |
| Concentrate | 29,2 | 28,3 | 1,0 | 33,3 |
| Leaching residue | 1,1 | 10,2 | 0,06 | |

| Oxidized liquor to the leaching steps | Analysis of Liquors in Grams per Liter | | | | | | | | Volume liters per hour |
|---|---|---|---|---|---|---|---|---|---|
| | $Cu^{2+}$ | $Cu^+$ | $Fe^{3+}$ | $Fe^{2+}$ | $Zn^{2+}$ | $SO_4^{2-}$ | $Cl^-$ | HCl | |
| Primary leaching step | 5 | 0 | 110 | 40 | 38 | 5 | 310 | 10 | 300 |
| Secondary leaching step | 5 | 0 | 110 | 40 | 38 | 5 | 310 | 10 | 30 |
| Reduced liquor to Cu—removal step | 2 | 36 | 0 | 179 | 39 | 11 | 310 | 25 | 285 |
| Liquor from secondary leaching step to the oxidizing step | 35 | 0 | 0 | 176 | 39 | 6 | 310 | 10 | 45 |

The analyses show that it was also here possible to leach the chalcopyrite completely by means of the described leaching system comprising one primary leaching step and one secondary leaching step when a leach liquor which essentially contains ferric-chloride is used and simultaneously obtain an essentially reduced liquor for further processing in a metal recovery step.

EXAMPLE 3

A complex zinc-copper-lead sulphide concentrate was leached in continuous equipment in accordance with the split flow process illustrated in FIG. 1. The primary leaching step 13 comprised two containers with stirring apparatus, each with an effective volume of 30 liters. The separation of the liquid and solids after the primary leaching step was effected by means of a thickener 15, and the solution in the overflow was processed in the subsequent metal recovery steps at 17 and thereupon regenerated in the regeneration step at 19, 23 and 24. The underflow from the thickener was further leached in the secondary leaching step 16.

The secondary leaching step took place in a container with stirring apparatus and an effective volume of 30 liters. The separation of the liquid and the solids was effected in a filter press 20. The filtrate was conducted further to a regeneration step 16, while the leach residue was removed from the process at 20.

As in the foregoing Examples, the temperature in the leaching steps was maintained at 105° C., and the process was controlled by means of red-ox electrodes in known manner.

The metal sulphide concentrate had the following analysis in % by weight:

| Cu | Pb | Zn | S |
|---|---|---|---|
| 8,12 | 7,15 | 23,2 | 37,4 |

The concentrate was supplied continuously to the primary leaching step at a rate of 6 kilograms per hour. Regenerated leach liquor was supplied to the primary leaching step 13 as well as to the secondary leaching step 16 at rates of 27 liters per hour and 9,5 liters per hour respectively. The overflow from the thickener 15 in the primary leaching step amounted to 22,2 liters per hour. The difference between 27 liters per hour and 22,2 liters per hour went into the underflow of the thickener together with the residue after the primary leaching step, and was conducted to the secondary leaching step.

(3) Analysis of the leach liquors in grams per liter was:

| | $Cu^{2+}$ | $Cu^+$ | $Fe^{3+}$ | $Fe^{2+}$ | Zn | Pb | Na | $SO_4^{2-}$ | $H^+$ | $Cl^-$ |
|---|---|---|---|---|---|---|---|---|---|---|
| Regenerated leach liquor | 40 | 0 | 125 | 25 | 40 | 12 | 27 | 12 | 0,27 | 406 |
| Leach liquor out of step 13 | 3 | 50,9 | 0 | 177 | 84,4 | 26,8 | 27 | 19 | 0,59 | 406 |
| Leach liquor out of step 16 | 52,1 | 0 | 29 | 142 | 67 | 18,4 | 27 | 31 | 0,42 | 406 |

Analysis of the residue from 21 shows that zinc had been leached with a total yield of 98%, lead 99,0% and copper 98,0% by weight.

Conclusion

The example shows that leaching of this type of ore according to this process also gives practically completely reduced liquor from the primary leaching step, and that this is combined with a practically completely leaching of the metal values.

Figure 2:
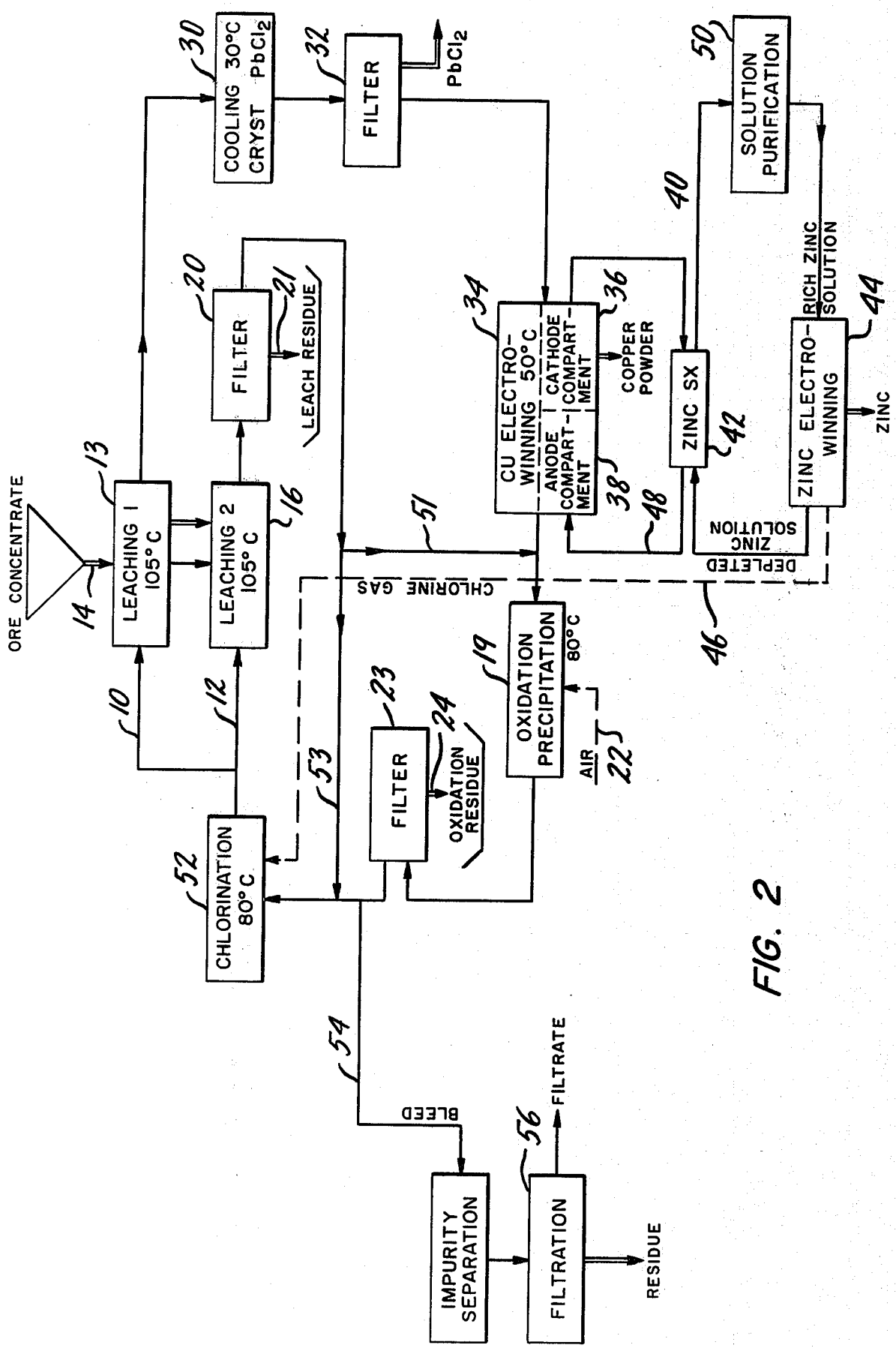
FIG. 2 is a simplified flow diagram of a second embodiment of the split flow leaching process of the present invention that illustrates a preferred way of recovering metals from the leach liquor.

The split flow process of FIG. 2 employs the same type of equipment and flow arrangement set forth in FIG. 1 but this embodiment illustrates a preferred type of recovery of metals from the primary leach liquor. The regenerated leach liquor in FIG. 2 is fed in a split flow at 10 and 12 to a primary leaching step 13 and secondary leaching step 16 respectively. Leaching is in accordance with the known red-ox principle with either concurrent or counter current continuous flow of liquor and metal sulphide-containing material.

A typical regenerated leach liquor may contain from about 100 to 175 grams per liter of ferric chloride and from about 10 to 85 grams per liter of cupric chloride. It usually contains about 10 grams per liter or more of hydrochloric acid and some small residual sulphate, zinc, lead, mercury and silver. Alkali or alkaline earth metal chlorides may also be added if desired to increase the solubility of lead, silver or cuprous chloride when these are present in high concentration in the liquor.

Metal sulphide-containing material (ore concentrate) containing one or more metal sulphides of iron, copper, lead, silver, mercury and zinc is fed at 14 and leached at 13 with a superstoichiometric amount of metal sulphide-containing material in relation to the oxidized compounds of cupric and ferric chloride in the leach liquor. As set forth in the foregoing examples, there may be relatively small amounts of bivalent cupric chloride in the liquor after the primary leaching step which small amounts can be tolerated in the metal recovery steps without any appreciable detriment.

In general, temperature of the liquor in both the primary and secondary leaching is maintained at or close to the boiling point of the liquor of about 105° C. but lower temperatures down to about 60° C. may be used to advantage where, for example, the ore concentrate has a high amount of extractable lead. As brought out above, at least 60% by weight of the leachable metals are extracted in the primary leaching step and preferably 90%. The amount of fresh regenerated liquor piped to the primary and secondary leaching steps may be equal or fifty times as much liquor may be piped to the primary leaching step over that amount supplied to secondary leaching.

The ore concentrate residue from the primary leaching step 13 is piped to the secondary leaching step 16 preferably through a conventional thickener and filter (not shown) to better separate the liquor and residue. The amount of leach liquor piped to the secondary leaching step provides a superstoichiometric amount of oxidized compounds of ferric and cupric chloride in relation to the metal sulphide-containing material to provide for an exceptionally high extraction of metal values.

The liquor and ore residue from the secondary leaching step 16 are separated by a conventional filter 20. The ore residue is removed at 21 and the liquor is piped to the regeneration step at 19.

Sulphur may be extracted from the residue by dissolving in an organic solution such as a perchloretylene type or recovered by melting in an autoclave. After removal of sulphur undissolved valuable elements nobler than silver such as gold etc. are leached out, for example, with cyanides, chlorine gas or other known methods.

Depending on the metals in the ore concentrate, typical reactions in the primary leaching step 13 may be as follows:

$$ZnS + 2FeCl_3 \rightarrow ZnCl_2 + S° + 2FeCl_2$$

$$CuS + FeCl_3 \rightarrow CuCl + S° + FeCl_2$$

$$CuFeS_2 + 3FeCl_3 \rightarrow CuCl + 2S° + 4FeCl_2$$

$$PbS + 2FeCl_3 \rightarrow PbCl_2 + S° + 2FeCl_2$$

$$2HgS + 2FeCl_3 \rightarrow Hg_2Cl_2 + 2S° + 2FeCl_2$$

$$Ag_2S + 2FeCl_3 \rightarrow 2AgCl + S° + 2FeCl_2$$

$$6FeCl_3 + S° + 4H_2O \rightarrow H_2SO_4 + 6FeCl_2 + 6HCl$$

As the ferric chloride is consumed in the primary leaching step 13, fresh ferric chloride is provided as long as cupric chloride remains in the liquor according to the equilibrium:

$$FeCl_2 + CuCl_2 \rightleftharpoons FeCl_3 + CuCl$$

Since a superstoichiometric amount of leach liquor relative to extractable metals is used in the secondary leaching step 16, the liquor from the secondary leaching will also contain cupric and ferric chloride in proportion to the excess present during secondary leaching.

Lead chloride when present in the liquor from the primary leaching step 16 is removed in conventional manner in conventional acid resistant precipitator at 30 by cooling the liquor which causes the lead chloride to precipitate. Lead chloride will precipitate at temperatures of about 30° C. to 50° C. and it may be removed at 30 but it is preferably washed on filter 32 in known manner and the wash water may be added to the liquor. The lead chloride from filter 32 is preferably subjected to electrolysis in known manner to produce metallic lead and chlorine gas. The chlorine gas is preferably recycled for regeneration of leach liquor (not shown). Any lead chloride remaining in the liquor is precipitated as lead jarosite during the oxidation regeneration step at 19.

It is important for maximum extraction of lead chloride to have as complete a reduction of cupric chloride to cuprous chloride as possible to reduce the solubility of lead chloride in the liquor. If desired, alkali or alkaline earth metal chlorides (NaCl, MgCl$_2$ etc.) may be added further to decrease the solubility of lead chloride in the liquor. In general, the amount of lead chloride extracted from the ore concentrate may be removed from the liquor by reduction of its temperature to a suitable extent.

After removal of lead chloride at 30, 32, copper, silver and mercury are removed by electrolysis in a conventional diaphragm cell 34 preferably with the liquor held at a temperature of about 30° C. to about 70° C. and usually at 50° C. A suitable conventional diaphragm is employed to separate the cathode compartment 36 from the anode compartment 38. The diaphragm is inert to the liquor, has minimum electrical resistance and maximum resistance to flow of liquor through the diaphragm. The diaphragm may be made of Teflon, polypropylene, polyethylene etc. in known manner. In a preferred form of electrolysis cell, titanium cathodes are employed and the anodes are dimensionally stable comprising titanium with a noble metal oxide layer coating. The bottom of the cell is cone-shaped to expedite collection and removal of copper powder which falls from the cathodes into the bottom of the cone. The size of the copper particles may be about 500 to 125 millimicrons.

The liquor is piped into the cathode compartment 36 of the electrolysis cell where the copper, silver and mercury are simultaneously deposited in known manner as metals on the cathodes in the cell and are collected and removed from the bottom of the cathode compartment. The amount of copper removed is approximately that which is extracted from the ore concentrate in the primary leaching step. In a typical operation, the current density in the cell may be from about 1.0 to 1.5 KA per square meter. The cell may be operated at about 50° to 70° C. A typical copper drop in the liquor may be 10 to 50 grams per liter.

It is important for electrolysis efficiency that the amount of cupric chloride in the liquor be as low as possible and this objective is achieved in accordance with the present invention by using a superstoichiometric amount of metal sulphide-containing material in the primary leaching step as compared to the cupric and ferric chlorides essentially to provide a complete reduction of these compounds to cuprous and ferrous chlorides in primary leaching.

Zinc chloride remains in solution in the catholyte which is piped from the cathode compartment 36 to the zinc recovery system 40. Any conventional system 40 may be employed for removal of zinc chloride from the catholyte but a preferred method for extracting the zinc chloride is described in a copending application Ser. No. 137,569 filed Apr. 7, 1980 the contents of which are incorporated herein by reference.

In accordance with the preferred method described in application Ser. No. 137,569, the catholyte from the cathode compartment 36 is piped to the zinc chloride organic solvent extraction at 42 where it is contacted by tri-n-butyl phosphate (TBP) diluted with about 60 percent by volume of a known diluent such as Exxon Solvesso 150 to extract zinc chloride from the liquor. Some small amount of ferrous and cuprous chloride are also extracted. After extraction of zinc chloride the aqueous liquor is returned to the anode compartment 38 of cell 34.

The organic TBP liquor is washed in conventional manner preferably in two separate steps to remove iron and then copper and thereafter the organic TBP is washed with an aqueous medium to remove the zinc chloride. The organic TBP is recycled for continuous extraction (42) of zinc chloride from the catholyte of cell 34.

The zinc chloride in aqueous medium is conducted to a conventional electrolysis diaphragm cell 44 where the zinc is deposited on the cathode by electrolysis in known manner and removed from the cell. The chlorine gas generated at the anode is preferably recycled as at 46 for regeneration of leach liquor.

In the preferred system, the anolyte from cell 44 is recycled as at 48 and used as the aqueous medium for stripping the zinc chloride from the organic TBP and a portion of the strip solution may also be used for removing the iron and copper. The aqueous anolyte scrub solutions containing iron and copper are preferably conducted to the regeneration stage (not shown) and combined with the anolyte from cell 34 for regeneration of leach liquor.

In the preferred system, the anolyte stripping solution rich in zinc may be further treated at 50 to remove iron and copper that may be present before being subjected to electrolysis in cell 44. For example, about 10 percent of the anolyte solution may be bled off and treated with lime to precipitate zinc and the other metal hydroxides. The resulting calcium chloride in solution from precipitation of metal hydroxides may be treated with sulfuric acid to produce hydrochloric acid and calcium sulfate. The calcium sulfate is separated and discarded as waste while the hydrochloric acid may be used in the regenerated leach liquor to maintain the conventional red-ox balance and used for final adjustment of the pH of the liquor for zinc electrolysis.

The precipitated metal hydroxides (pH 7) may be returned to the mainstream of the anolyte stripping solution to adjust the pH to about 2.0 to about 2.5. Air may also be introduced into the solution along with the metal hydroxides to oxidize ferrous ions to ferric with resulting precipitation of ferric hydroxide which is removed from the solution before zinc electrolysis and returned to the main leach liquor at the regeneration stage. After separation of ferric hydroxide, zinc dust is added to the stripping solution to precipitate copper which is removed and thereafter the pH of the stripping solution is adjusted to pH of about 1.0 and the solution is fed to the cathode compartment of cell 44 for zinc electrolysis.

Since the organic TBP has a strong affinity for ferric ions, it is of advantage to avoid formation of ferric ions during electrolysis in cell 34 and to maintain cuprous chloride in the catholyte. Cupric chloride may upset the equilibrium with resulting conversion of ferrous chloride to ferric chloride which could interfere with extraction of zinc by TBP. The organic extraction is preferably carried out under an inert atmosphere to avoid air oxidation of ferrous to ferric ions. An advantage to using the catholyte from cell 34 for zinc extraction is that copper is at its lowest concentration and coextraction of copper by TBP is therefore minimized.

The electrolysis cell 44 is a conventional diaphragm cell in which the catholyte is piped directly to the anode compartment of cell 44 which is operated in known manner. The diaphragm may be artificial fiber cloth as for example polypropylene or Teflon cloth. Preferably aluminum cathodes and dimensionally stable anodes (DSA) are employed. For best results, copper in the feed solution for zinc organic extraction at 42 should not exceed about 50 grams per liter.

In one typical operation the liquors had the following analysis in grams per liter:

|  | $Fe^{3+}$ | $Fe^{2+}$ | $Cu^{2+}$ | $Cu^+$ | Zn | Pb | HCl | $SO_4^{-2}$ |
|---|---|---|---|---|---|---|---|---|
| From 13 | 0 | 153 | 5 | 33 | 104 | 30 | 19.5 | 11.4 |
| From 32 | 0 | 186.3 | 6.0 | 40.4 | 126.5 | 12 | 23.7 | 13.9 |
| From 36 | 0 | 182.7 | 0 | 25.9 | 124.7 | 11.9 | 23.4 | 13.7 |
| Into 38 | 0 | 188.2 | 0 | 23.3 | 18.8 | 13.5 | 24.6 | 15.5 |
| Into 19 | 58.3 | 96.9 | 8.0 | 17.2 | 48.4 | 21.6 | 14.0 | 9.5 |
| Into 52 | 63 | 87 | 25.2 | 0 | 48.4 | 21.6 | 4.0 | 5.0 |

Increases in the liquor constituents from 32 are due to water evaporation. The small drop in concentration of the constituents other than copper in the catholyte from 36 is caused by washing the copper powder from the cell and returning the wash water to the catholyte.

In a typical operation, the organic TBP which contacts the catholyte from 36 may contain about 1.8 to 2.5 grams of zinc per liter and after extraction of zinc from the catholyte the organic TBP may contain about 18-23 grams of zinc per liter. The extraction is preferably carried out at about 30° C. with a phase volume ratio of catholyte to organic flow of about 0.146.

The aqueous anolyte from cell 44 may contain about 20-25 grams of zinc per liter and after stripping of the organic TBP, the pregnant electrolyte may contain 60-75 grams of zinc per liter which is preferably purified at 50 to remove iron and copper which would otherwise contaminate the zinc obtained by electrolysis in cell 44. The current density for electrolysis of zinc in cell 44 may be about 200 to 400 amperes per square meter. If desired the anolyte from cell 44 may be stripped of dissolved chlorine gas in conventional manner prior to stripping of TBP and the recovered chlorine recycled for regeneration of the main leach liquor.

During electrolysis in cell 34, chloride ions are transferred to the anode compartment 38 where the chloride ions oxidize cuprous and some ferrous chloride to cupric and ferric chloride. The anolyte from cell 34 is preferably combined with the secondary leach liquor from 20 as at 51 and fed to the regeneration vat 19 where air is injected into the liquor held at a temperature of about 80° C. to regenerate the leach liquor in conventional manner.

In the air oxidation stage hydrochloric acid is consumed by reaction with ferrous chloride to produce ferric chloride. Sodium chloride or other alkali salts are added if necessary for precipitation of dissolved iron chloride as jarosite which also consumes and removes sulfate from the liquor. Some lead jarosite may also be precipitated. Iron is also precipitated as goethite by the oxygen and cuprous and ferrous chlorides are oxidized to cupric and ferric chloride. The precipitated materials are removed by filter 23. In a typical operation about 18 grams per liter of jarosite and goethite are removed from the liquor.

Final oxidation is achieved at 52 by introducing the partially oxidized liquor into the top of a conventional counter flow tower while a chlorine gas-air mixture is fed into the bottom of the tower. Oxidation is preferably carried out at a temperature of about 80° C. The fully regenerated leach liquor contains a residual of from about 15 to 25 grams per liter of ferrous chloride which insures that the off gas is free of chlorine and may be released to the atmosphere. The regenerated leach liquor is recycled back to primary and secondary leaching at 10 and 12 respectively in a continuously operating closed loop.

About 5 to 10 percent of leach liquor is preferably bled off at 54 for separation of solid impurities as by filtration at 56 and the filtrate is recycled back to the main stream of leach liquor. If desired, the secondary leach liquor may be piped directly as at 53 to chlorine regeneration at 52. It is not necessary to subject the secondary leach liquor to oxidation at 19 since the liquor has not gone through the metal recovery loop 17.

The red-ox potential of the leaching liquor may be that conventionally used. In a typical operation the red-ox potentials of the liquor in the closed loop as determined in known manner by kalomel electrodes were as follows:

| Liquor | MV(SCE) |
| --- | --- |
| Into 13 and 16 | 630 |
| Out of 13 | 340 |
| Out of 16 | 500 |
| Into 36 | 340 |
| In 36 | 320 |
| Out 38 | 480 |
| Out of 19 | 525 |
| Out of 52 | 630 |

All of the equipment employed in the process are made of or are coated with materials known to resist corrosion by the process acids. For example, the vats and electrolysis cells may be made of glass fiber reinforced polyester and rubber. Glass and rubber coated steel may also be employed and polypropylene and polyethylene and acid resistant rubber is used for piping and connections. Titanium and other known acid resistant metals are used for impellers and pumps. Closed reaction vessels are preferably employed to keep vapor losses to a minimum.

What is claimed is:

1. In a method for leaching metal sulphide-containing raw materials which contain one or more metal sulphides of copper, iron, lead, silver, mercury and zinc by treatment with a solution which chiefly consists of cupric chloride and ferric chloride, whereby the metal values in the raw material are brought into solution as metal chlorides which are recovered from the solution and wherein the solution from which the metal values have been recovered is subjected to a regenerating process, whereby cuprous chloride and ferrous chloride is reoxidized to cupric chloride and ferric chloride which is used over again in the leaching process, the improvement comprising the steps of leaching freshly supplied metal sulphide-containing raw material in a primary leaching step wherein the metal sulphide-containing raw material is present in excess in relation to the oxidizing compounds in the leaching solution so that the oxidizing compounds in said leaching solution are essentially completely reduced after contact with the raw material and wherein the residue of said raw material from said primary leaching step is again brought into contact with an excess of fresh leaching solution in a secondary leaching step for further leaching of said residue without substantial reduction of the oxidizing compounds in said leaching solution, the resulting liquor from said secondary leaching step being recycled for use in generating fresh leach solution.

2. Method as in claim 1, characterized in that the ratio between that amount of leaching solution which is passed to the primary leaching step and that amount of solution which is passed to the secondary leaching step is in the range 1–50 to 1, respectively.

3. A hydrometallurgical process for recovery of metals from metal-sulphide materials which contain one or more metal sulphides of copper, iron, lead, and zinc which comprises the steps of:

(a) leaching said metal-sulphide material with an aqueous liquor containing ferric and cupric chlorides to extract a portion of said metals as chlorides from said material in a primary red-ox leaching step;

(b) separating the metal-sulphide material from the liquor after leaching in the primary leaching step and subjecting said separated material to separate leaching with aqueous liquor containing ferric and cupric chlorides to extract metals as chlorides from said material in a secondary leaching step;

(c) removing lead chloride from the leach liquor from the primary leaching step;

(d) after removing lead chloride, conducting said liquor to the cathode compartment of a diaphragm electrolysis cell for removal of copper at the cathode and generation of oxidized chloride ions in the anode compartment of said cell;

(e) conducting the leach liquor from the cathode compartment of said cell to a separate treatment for removal of zinc;

(f) after removing zinc conducting said leach liquor back to the anode compartment of said cell;

(g) separating the leach liquor of said secondary leaching step from the residue of said material;

(h) combining said separated liquor from the secondary leaching step with the leach liquor from the anode compartment of said cell; and (i) subjecting the combined liquor to regeneration to form fresh leach liquor containing ferric and cupric chlorides for red-ox leaching of said metal-sulphide material in said primary and secondary leaching steps.

4. The process of claim 3 which includes the step of continuously recycling said leach liquor in a closed loop.

5. The process of claim 3 which includes the step of feeding the fresh regenerated leach liquor simultaneously in a split flow to said primary and secondary leaching steps.

6. The process of claim 3 which includes the step of separating lead chloride by reducing the temperature of the liquor to precipitate lead chloride which is removed from the liquor.

7. The process of claim 6 which includes the steps of subjecting the separated lead chloride to electrolysis to produce metallic lead and chlorine which chlorine is recycled for regenerating the leach liquor.

8. The process of claim 3 which includes the steps of contacting the liquor from the cathode compartment of said cell with an organic liquor to remove zinc chloride from said aqueous liquor and recycling said aqueous liquor back to the anode compartment of said cell after removing zinc chloride and stripping the zinc chloride from said organic liquor with a separate aqueous medium and conducting the separate aqueous medium containing zinc chloride to the cathode compartment of a diaphragm electrolysis cell to extract zinc metal at the cathode and generate chloride at the anode which chloride is recycled for regenerating the leach liquor.

9. The process of claim 8 which includes the step of recycling the aqueous liquor from the anode compartment of said cell as the aqueous medium for stripping zinc chloride from said organic liquor.

10. The process of claim 3 which includes the step of subjecting the liquor from said anode compartment of said cell to regeneration by injecting air into the liquor to precipitate iron and after removing iron combining said liquor with the liquor from said secondary leaching step and injecting chlorine into said combined leach liquor to form fresh leach liquor for red-ox leaching of said metal-sulphide material.

11. The process of claim 3 which includes the steps of carrying out the primary leaching step in the presence of a superstoichiometric amount of metal-sulphide containing material in relation to the oxidized compounds of ferric and cupric chlorides and of carrying out the secondary leaching step in the presence of a superstoichiometric amount of the oxidized compounds of ferric and cupric chlorides in relation to the metal-sulphide containing material.

12. The process of claim 11 which includes the step of extracting between about 60 to about 90 percent by weight of leachable metals in the primary leaching step from said metal-sulphide containing material.

13. A continuous hydrometallurgical process for recovery of metals from metal-sulphide materials containing one or more metal-sulphides of copper, iron, lead and zinc in accordance with the red-ox principle in which the leach liquor is recycled in a closed loop which comprises the steps of:
(a) supplying regenerated leach liquor containing ferric and cupric chlorides simultaneous in a split flow to a primary and a separate secondary red-ox leaching step;
(b) supplying metal-sulphide containing material to said primary leaching step and carrying out said primary leaching in the presence of an excess of metal-sulphide material in relation to said oxidized compounds of ferric and cupric chlorides in said leach liquor to extract a portion of said metals as soluble chlorides from said material;
(c) separating the leach liquor containing said soluble metal chlorides from said material;
(d) conducting said separated material to the secondary leaching step and subjecting the material to secondary leaching in the presence of an excess of said oxidized compounds of ferric and cupric chlorides in relation to the metal-sulphide material;
(e) separating the residue of said material from the leach liquor in said secondary leaching step;
(f) cooling the liquor from said primary leaching step to precipitate and remove lead chloride;
(g) after removing lead chloride, conducting said leach liquor to the cathode compartment of a diaphragm electrolysis cell and removing metallic copper at the cathode;
(h) conducting leach liquor from the cathode compartment of said cell to separate treatment for extraction of zinc chloride;
(i) contacting said leach liquor with an organic liquor in said separate treatment to remove zinc chloride and thereafter returning said leach liquor to the anode compartment of said cell for regeneration by chloride ions in the anode compartment of said cell;
(j) contacting the organic liquor with an aqueous medium to strip zinc chloride from said organic liquor;
(k) conducting said aqueous medium with zinc chloride therein to the cathode compartment of a diaphragm electrolysis cell to remove metallic zinc at the cathode and generate chlorine at the anode;
(l) recycling the anolyte from said cell for use as the aqueous medium for stripping zinc chloride from said organic liquor;
(m) conducting the anolyte from the copper extraction cell to further regeneration by oxidation and chlorination to precipitate iron and form fresh leach liquor which is recycled in a closed loop for red-ox leaching of said metal-sulphide material;
(n) combining said leach liquor from said secondary leaching step with the anolyte from the copper extraction cell to subject said secondary leach liquor at least to chlorine regeneration.

14. The process of claim 13 which includes the step of extracting at least about 60 to about 90% by weight of leachable metals from said material in the primary leaching step.

* * * * *